(12) United States Patent
Vasishtha et al.

(10) Patent No.: US 10,045,296 B2
(45) Date of Patent: Aug. 7, 2018

(54) METHOD AND APPARATUS TO CONTROLLING SLEEP TIME FOR BLUETOOTH DEVICE AND BLUETOOTH ENABLED DEVICE

(71) Applicant: Intel IP Corporation, Santa Clara, CA (US)

(72) Inventors: Praveen K. Vasishtha, San Diego, CA (US); Yashodhara Devadiga, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/385,359

(22) Filed: Dec. 20, 2016

(65) Prior Publication Data

US 2018/0176864 A1 Jun. 21, 2018

(51) Int. Cl.
| | |
|---|---|
| *H04B 7/00* | (2006.01) |
| *H04B 15/00* | (2006.01) |
| *H04W 52/02* | (2009.01) |
| *H04W 4/00* | (2018.01) |
| *H04W 72/04* | (2009.01) |
| *H04W 4/80* | (2018.01) |

(52) U.S. Cl.
CPC ....... *H04W 52/0229* (2013.01); *H04W 4/008* (2013.01); *H04W 4/80* (2018.02); *H04W 52/0287* (2013.01); *H04W 72/0446* (2013.01)

(58) Field of Classification Search
CPC ............. H04W 4/008; H04W 52/0216; H04W 52/0235; H04W 52/0258; H04W 52/0293

USPC ................................ 455/41.2–41.3, 502–503
See application file for complete search history.

(56) References Cited

U.S. PATENT DOCUMENTS

| 9,510,289 B1* | 11/2016 | de Ruijter | H04W 52/0235 |
|---|---|---|---|
| 2006/0240798 A1* | 10/2006 | Jarosinski | H04B 1/1615 |
| | | | 455/343.1 |
| 2010/0112950 A1* | 5/2010 | Haartsen | H04B 5/0056 |
| | | | 455/41.3 |
| 2013/0003626 A1* | 1/2013 | Husted | H04W 52/0293 |
| | | | 370/311 |
| 2015/0092642 A1* | 4/2015 | Geboff | H04W 4/008 |
| | | | 370/311 |
| 2017/0011238 A1* | 1/2017 | Rol | G06K 7/10029 |
| 2017/0064633 A1* | 3/2017 | Jia | H04W 52/0258 |
| 2017/0164283 A1* | 6/2017 | Choi | H04W 52/0216 |

\* cited by examiner

*Primary Examiner* — Simon Nguyen
(74) *Attorney, Agent, or Firm* — Schiff Hardin LLP

(57) ABSTRACT

A method and apparatus for extending the sleep time for a Bluetooth transceiver circuit uses a fine count signal and a base count signal during the sleep mode, followed by an interval that accounts for wake-up overhead and preparation for the next active mode. The wake-up to active mode is aligned with the timing signal that defines the communication slots in the Bluetooth communications. The extension of the sleep mode until a beginning of a communication slot in active mode is accomplished for wake-up processes that are initiated by an external trigger event as well as for wake-up processes that are initiated as a result of an internal timer. Power consumption is reduced because the circuit does not wake up to active mode before communication can be carried out in a communication slot.

18 Claims, 3 Drawing Sheets

METHOD AND APPARATUS TO CONTROLLING SLEEP TIME FOR BLUETOOTH DEVICE AND BLUETOOTH ENABLED DEVICE

TECHNICAL FIELD

The present disclosure relates generally to a method and apparatus for controlling sleep time in a wireless communication device, and more particularly to a method and apparatus for controlling sleep time for a Bluetooth wireless communication device.

BACKGROUND

Bluetooth is a wireless communication standard that enables communication between devices using short-wavelength radio waves in the ISM 2.4 GHz band. Data is transmitted in packets between devices that assume a master-slave relationship, possibly with several devices serving in the slave role in a piconet, or ad hoc wireless network of devices using the same physical channel. All of the devices communicating with the master device in the piconet share the master device's clock. The basic clock signal provides clock events, either a rising or falling edge, at 312.5 µs intervals. Two 312.5 µs clock cycles make up one 625 µs time slot. Data is transmitted between Bluetooth devices in the time slots. Data may be sent from the master device to a slave device beginning in even numbered time slots and the master device may receive data from a slave device beginning in the odd numbered time slots.

Bluetooth devices may enter a sleep mode in which some of the electronic circuits are temporarily deactivated or put into low power consumption mode to save battery energy. Bluetooth sleep modes may be of different durations which may be assigned names depending on the duration and other characteristics. In an example, a sniff mode provides that the device sleeps at a reduced power consumption for 50 ms (millisecond), whereas a hold mode allows the device to sleep for 500 ms, and a park mode may permit the device to sleep for 10 seconds. Other durations are also possible.

Bluetooth devices may go into sleep mode several times a second, depending on the use case. Bluetooth devices may be awakened from a sleep mode by expiration of a time duration set by an internal clock or by the device receiving an external signal.

DETAILED DESCRIPTION

Figure 1:
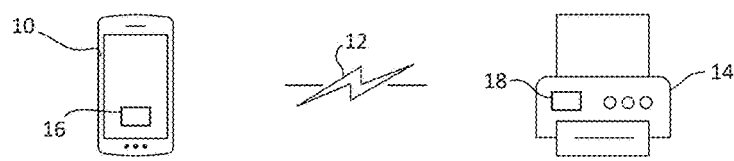
FIG. 1 is a schematic illustration of an exemplary communication using wireless communication.

A Bluetooth transceiver typically uses a 3.2 KHz active time clock signal for generating a 625 µs internal reference timing signal. The 3.2 kHz clock signal is made up of (1/32000=0.0003125) 312.5 µs intervals, which are doubled to obtain the 625 µs intervals for the timing signal. Bluetooth communications are carried out by over-the-air packet communications within the 625 µs time slots. The over-the-air packet transactions may include transmitting pairing requests (also referred to as advertising), scanning for pairing requests from other devices, or carrying out communications during connection events. During times when data is not being communicated, the Bluetooth transceiver circuit may switch to sleep mode, for example, between over-the-air packet transactions, to conserve power. The transceiver may be put into sleep mode as often as several times a second. The conventional implementation of sleep logic hardware uses a low power clock at either 32 KHz or 32.768 KHz (equaling 31.25 µs or 30.5 µs intervals) as a sleep fine-count signal in order to track the sleep duration.

The transition from the active state of the Bluetooth transceiver circuit to the sleep mode and from sleep mode to an active state in a wake-up process happens on the 32 KHz or 32.768 KHz clock signal boundary (either a rising or falling edge of the signal). After the wake-up process, the active clock or 3.2 KHz reference clock signal needs to be updated in the units of either 32 KHz or 32.768 KHz cycles to account for the time spent in sleep mode.

The wake-up process from the sleep mode to the active mode may be triggered by the expiration of an internal sleep timer or may be triggered by an external event such as by receipt of a wake-up signal. The wake-up time at the end of a sleep mode is not always synchronized with the internal clock signal. For a wake-up event that is triggered by an external wake-up trigger, the wake-up instant could be anywhere between two 625 µs reference timing instants due to the asynchronous nature of the external trigger. The total sleep time need not be the same for an externally triggered wake-up as for a wake-up event that is triggered by the sleep timer expiration (a scheduled wake-up).

When a wake-up instant occurs between 625 µs reference instants (which may be determined by a rising or falling edge of a clock signal), the device wakes up and stays awake (using power at a higher level) until a next 625 µs reference instant but does not start the over-the-air Bluetooth packet transaction until the next 625 µs clock reference instant occurs. The Bluetooth circuit of the device consumes power while staying awake without performing a Bluetooth transaction. More power is used than is necessary to perform the Bluetooth communications. When the wake-up instant occurs closer to a previous 625 µs clock signal instant than to a next 625 µs clock signal instant, more of the 625 µs interval transpires with the Bluetooth circuit awake but not performing a Bluetooth over-the-air transaction, resulting in more unnecessary power being consumed than if the wake-up instant occurred closer to the next clock signal instant.

According to certain aspects, the sleep time of the sleep mode may be increased for a wake-up event that is the result of an internal or external trigger in order that the time is reduced during which the circuit is awake without performing over-the-air transactions. The wake-up process may use a sleep clock rate of 1.6 KHz that has been derived from either the 32 KHz or 32.768 KHz clock signal. Using a lower frequency signal that has been derived from the clock signal, the wake-up instant may be aligned to a 625 µs instant. Using this method allows the device to remain in sleep mode until used. In certain examples, the transceiver remains in sleep mode until the timing signal boundary, or until a sleep base-count signal boundary, hence maximizing the sleep time.

Referring first to a diagram as shown in FIG. 1, a device 10, shown here as a smart phone or cellular mobile telephone, is Bluetooth enabled to allow the device 10 to communicate wirelessly with other Bluetooth enabled devices. In the illustration, the device 10 is wirelessly communicating over-the-air transactions, as indicated at 12, with a second device 14. The second device 14 of the illustration is a printer. Other devices, such as headsets, speakers, headphones, earphones, keyboards, mice or other pointing devices, computers, tablet computers, mobile phones, video game controllers, watches, heartrate monitors, fitness or activity monitors, or other devices may be provided as one or both of the devices 10 and 14. During the wireless communication, data 12 may be transmitted between the devices 10 and 14, for example using packets. The smart phone device 10 includes a Bluetooth circuit, shown schematically at 16, that operates to provide the Bluetooth wireless communication 12 for the device 10. Similarly, the printer device 14 includes a Bluetooth circuit 18 that operates to provide the Bluetooth wireless communication 12 for the device 14. Part or all of the Bluetooth circuits 16 and 18 may be operated at reduce power or may be shut off entirely in a sleep mode when not needed to carrying out the wireless communications. Power is saved by placing the circuits in the sleep mode, which may be particularly useful to reduce drain on the battery for battery powered devices. The sleep mode of certain examples provide that all of the components of the Bluetooth circuit except a power management unit go to sleep. In an exemplary aspect, the power management unit can include processor circuitry that is configured to perform one or more functions and/or operations of the power management unit. The components of a Bluetooth circuit that are shut down or run at reduced power when the transceiver goes into sleep mode may include a CPU (central processor unit), a MAC (media access control), and a radio. Some of the internal RAM (random access memory) of the device may also be shut off in sleep mode or may remain on depending on the system configuration and the use case. In certain examples, the Bluetooth circuit may consume about 2 milliamps (2,000 micro amps) when in active mode but may consume 3 to 4 micro amps in sleep mode.

Figure 2:
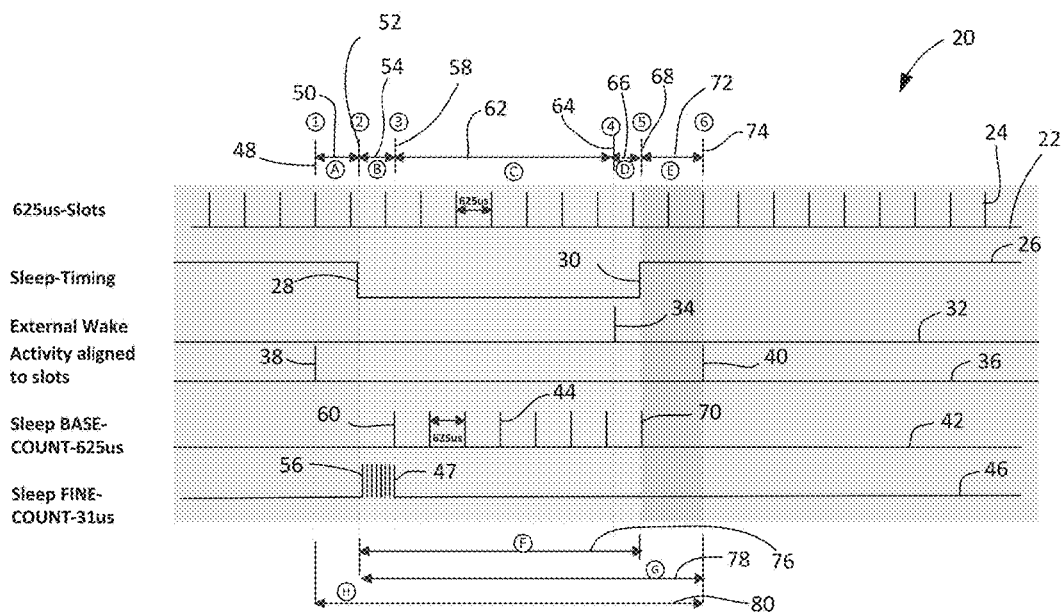
FIG. 2 is a graph showing an exemplary wake-up process for a Bluetooth device waking up as a result of receiving an external wake-up signal.

Referring now to FIG. 2, a signal diagram 20 shows signals which may be present in a Bluetooth circuit of a Bluetooth enabled device, for example, the Bluetooth circuits 16 or 18 of the Bluetooth enabled devices 10 or 14, and which shows the circuit switching between active and sleep mode. The signals of this example may be from a Bluetooth circuit on a chip and from a crystal oscillator of a timer circuit. In the illustration, the Bluetooth transceiver circuit is being switched from the active mode to the sleep mode and then awakened from the sleep mode after a sleep period for return to the active mode. In the drawing, the duration of the sleep period is but a few clock cycles for purposes of illustration but may be of lesser or greater duration in practice. A wake-up from the sleep mode is triggered in this example by an external wake-up event, such as receipt of an external wake-up signal. The wake-up process of the Bluetooth circuit is controlled so as to increase the duration of the sleep mode. The increased sleep mode duration may reduce the time during which the circuit is awake without conducting the communications and other Bluetooth operations.

In the signal diagram 20 is shown a first signal or timing signal 22 that defines 625 µs slots. The Bluetooth specification defines the slot size as 625 µs. In the illustrated example, the timing signal 22 includes a series of narrow pulses 24 spaced from one another by a duration of 625 µs, each of the pulses 24 being shown as a vertical line. In practice, the pulses may have a duration or width that is greater than the narrow pulse shown in the illustration. Either the rising edge or the falling edge of each pulse 24 may define the timing instance. It is foreseen that the pulses may have a duration of 625 µs and a spacing of 625 µs so that, for example, a slot begins on a rising edge of the pulse and the next slot begins on a falling edge of that same pulse. Other arrangements for the timing signal and other slot durations are encompassed within the present aspect.

A second signal 26 is a sleep timing signal. The sleep timing signal of the illustrated embodiment includes a high signal until a falling edge 28 is reached, after which the signal remains low until a rising edge 30 is reached. The signal 26 may be inverted or may take the form of pulses.

Below the sleep timing signal 26 is an external wake-up signal 32. The external wake-up signal 32 is received from an external source and includes a wake-up instant 34 that triggers the waking process. The wake instant 34 is shown as a vertical line or narrow pulse. The wake-up instant 34 may be a rising or falling edge of a signal, for example.

A signal 36 shows activity aligned to the timing slots 22. A first alignment instant 38 indicates the end of an active mode of the circuit and is aligned with a timing instant 24. The conclusion of the active mode initiates the process of entering the sleep mode. In the illustration, the sleep mode entering process has a duration of more than one 625 µs slot. A second alignment instant 40 indicates a resumption of the active mode and is aligned with a timing instant 24 of the signal 22.

A sleep base count signal 42 includes a plurality of pulses 44 at a spacing of 625 µs from one another. The first of the pulses 44 may occur 625 µs after start of the sleep mode at 28 as indicated by the sleep timing signal 26. The sleep base count pulses 44 continue at 625 µs intervals until a final sleep base count pulse 44 that is aligned with the end of the sleep timing signal 26 at a rising edge 30. The sleep clock signal is at 1.6 kHz and may be derived from a 32 kHz or 32.765 kHz low power clock by for example counters, dividers, or the like. The sleep base counter can trigger the wake-up of the chip. The frequency of the base count sleep counter is 1.6 kHz.

Lastly, a sleep fine count signal 46 is provided. The sleep fine count signal 46 includes a plurality of pulses 47 at a spacing of approximately 31 µs and for a duration of 625 µs. The sleep time is calculated using the sleep fine count signal 46. The fine count is based on the slow or sleep clock timing of 32 or 32.765 kHz clock signal. The sleep time is being extended using the base count, not the fine count in the example. The sleep fine count may be either 31 µs or 30.5 µs depending on the hardware design. The fine count slow clock may be either 32 kHz or 32.768 kHz. The slow or sleep clock is not synchronized to the 1.6 kHz signal but is running all the time. The fine count signal in the drawing is shown only over one pulse length, but in practice is running all the time.

To maximize the sleep duration and avoid waking the circuit before it is to be used, the present method and apparatus calculates sleep time in terms of the sleep fine count signal 46, which in an example includes pulses spaced at 30.5 µs and the sleep base count signal 42, which has pulses spaced at 625 µs. The wake-up process takes into account overhead of the circuit which includes factors such as the crystal warmup time of the oscillator. For example, the crystal oscillator in the transceiver circuit may need to warm up for a time before reaching the desired operating characteristics.

Significant times and intervals are marked along the top of the graph 20. A slot time for a last activity before the circuit goes to sleep is indicated at time 48. The time 48 is aligned with the pulse 38 in the signal 36. Post processing activity takes place after the time 48 and during an interval 50 until a time 52. The time 52 indicates the time at which the circuit goes into low power sleep mode. The time 52 aligns with the falling edge 28 of the sleep timing signal 26.

After the beginning of the sleep mode, during an interval 54 the sleep fine-count signal 46 provides a series of pulses 47, which are spaced at about 31 µs and which start at 56. At time 58, the sleep fine-count signal expires. At the expiration of the sleep fine-count signal 56 at time 58, the sleep base-count signal 42 begins a series of pulses 44 which start at 60. The sleep base-count signal 42 provides a series of the pulses 44 at a 625 µs spacing. The sleep base-count signal 42 continues for a duration 62 until a time 64 when the external wake-up signal 34 is received. If the circuit were to wake-up upon receipt of the wake-up signal 34 is received, it would be using power but not performing over-the-air communications. Instead, the circuit stays in sleep mode for a time.

The sleep mode continues after the external wake-up signal 34 is received for a duration 66 which is defined as the duration between the receipt of the external wake-up trigger and the sleep base count cycle end. At a time 68 which is aligned with a sleep base count pulse 70 of the sleep base-count signal 42, the sleep timing signal 26 returns to a high level at 30. The time 68 indicates a wake-up at the next sleep base count activity.

At the time 68, a wake-up overhead and prepare next activity interval 72 begins. The duration of the interval 72 is based on the hardware and/or software initialization time as required for the next active cycle. The interval 72 may include a crystal warm up time for the oscillator used in the circuit. The crystal warm up time may be determined from a component data sheet for the oscillator, for example. An example of an oscillator may require 1.2 ms (milliseconds) to warm up, and another example of an oscillator may require 10 ms to warm up. Other warm up durations are of course possible depending on the hardware and/or the software. The preparation for the active mode also may depend on the chip used. The preparation time may vary from chip to chip depending on parts variations and characterization. In certain examples, the preparation time may be considered a fixed value.

The interval 72 includes a remainder of the timing slot from the end of the sleep mode to a next timing slot. If the hardware and/or software initialization takes up more time than is available in the remaining portion of the timing slot from the end of the sleep mode, a next full slot may be used. The interval 72 length may be programmed into the operating code. In certain examples, the boot-up/initialization code is profiled and the time required for the wake-up overhead is computed. The main system clock source is generated from a crystal oscillator and is turned off during sleep mode and turned on for active mode. The power-on delay of the crystal may be referred to as the crystal warm-up time.

In a first configuration, another fast clock signal such as a silicon oscillator may be available during the crystal warm-up. In this case, the crystal warm-up time is the value that may be used for the wake-up overhead time, as shown by the following equation. The initialization code may be executed by another clock source during the crystal warm-up time.

$$T_{wake\text{-}up\ overhead} = T_{crystal\text{-}warmup}$$

In case the initialization time or boot-up time is more than the crystal warm-up time, then the wake-up overhead time may equal the boot-up or initialization time, as shown in the following equation.

$$T_{wake\text{-}up\ overhead} = T_{boot\text{-}up/initialization}$$

In a second configuration, where no other fast clock signal is available during the crystal warm-up time, the wake-up overhead duration may equal the crystal warm-up time plus the boot-up or initialization time, as shown in the following equation.

$$T_{wake\text{-}up\ overhead} = T_{crystal\text{-}warmup} + T_{boot\text{-}up/initialization}$$

The control of the sleep mode extension and wake-up duration may be provided by software modules, by hardware, or by a combination of both. The software may be executed on a processor to carry out the method. The awakening of the Bluetooth circuit from the sleep mode effects a physical change in the physical world. In particular, the circuit elements are powering up from a low power or off mode to an operating mode in alignment with the clock signal as a result of the method. The present method changes the operation of the device. In particular, the sleep mode is extended beyond a wake-up signal until an active mode can be resumed in alignment with a timing signal.

After the interval 72 expires at time 74, the circuit is ready to resume active mode after waking up. The Bluetooth circuit is awake and ready for wireless communication activity to be is carried out beginning at the time 74.

Intervals are shown along the bottom of the graph 20. An interval 76 indicates the total sleep time. The interval 76 shows the total time to a next activity. Of course, the length of the interval shown is but an example and may in practice be longer or shorter. When the Bluetooth circuit is about to go to low power mode, the process determines the current time and a next scheduled slot time.

An interval 78 indicates the duration of the next slot activity from the time to go to sleep. The interval 78 is divided into three parts that include a sleep fine-count at 30.5 µs intervals (about 31 µs), a sleep base-count at 625 µs intervals, and a wake-up overhead and prepare next activity time.

An interval 80 indicates a duration between two activities by the Bluetooth circuit.

In the scenario where the sleeping circuit is awakened as a result of an external wake-up signal being received, the circuit will wake-up and will still start the active mode activity at a time determined by the sleep base count clock signal. Even if the circuit were to awake earlier, the circuit would need to wait until a next slot for any RF (radio frequency) activity. The circuit should keep sleeping and wake-up only at the sleep base count edge and that would save anywhere between 0-624 µs active time for each time the circuit is awakened from the sleep mode.

Figure 3:
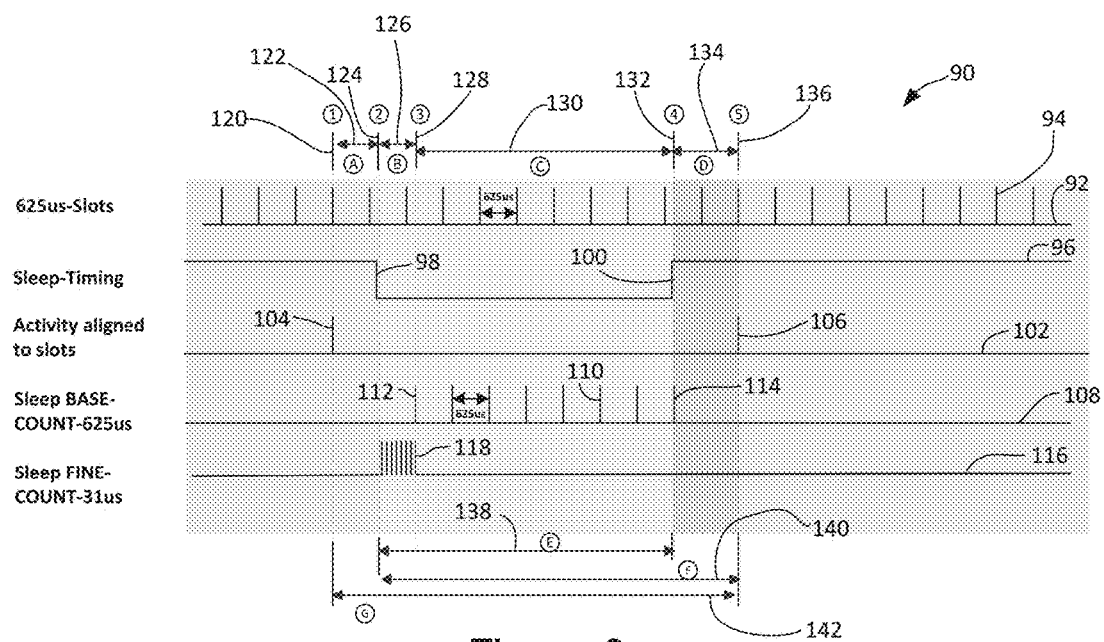
FIG. 3 is a graph showing an exemplary wake-up process for a Bluetooth device waking up as a result of an internal clock signal.

In a second aspect of the method and apparatus, the sleeping Bluetooth transceiver is awakened by an internal sleep timer after an end of a scheduled sleep time. As shown in FIG. 3, a graph 90 of some of the signals involved in the sleep mode and awaking from the sleep mode are shown. A 625 µs signal 92 provides a series of pulses 94 spaced at 625 µs from one another. A sleep timing signal 96 is at a high level until a falling edge 98 at the start of the sleep mode.

The sleep timing signal 96 is at a low level after the falling edge 98 and remains there until a rising edge 100 at or near the end of the sleep mode. The rising edge 100 may trigger the wake-up process.

An activity aligned to slots signal 102 includes a first pulse 104 which is aligned with a pulse 94 of the 625 μs slots signal 92. The first pulse 104 is at the end of an active mode as the circuit begins the process of entering the sleep mode. The activity aligned to slots signal 102 includes a second pulse 106 that is aligned to a pulse 94 of the 625 μs slots signal. The second pulse 106 is at or near the end of the sleep mode and at or near the resumption of the active mode.

A sleep base count 625 μs signal 108 includes a series of pulses 110 spaced by 625 μs from one another. The first pulse 112 is 625 μs from the start of the sleep mode at the falling edge 98. The pulses 112 continue during the duration of the sleep mode until a final pulse 114 that is aligned with the rising edge 100 of the sleep timing signal 96. A sleep fine count signal 116 includes a series of pulses 118 spaced about 31 μs from one another. The pulses 118 begin aligned with the falling edge 98 of the sleep timing signal 96 and continue for a slot duration, or 625 μs before ending.

Along the top of the graph 90 is marked times and intervals including a first time 120 which indicates the time for the last activity before the circuit enters the sleep mode. An interval 122 follows the time 120. During the interval 122, the last time slot activity occurs before the sleep mode. At the conclusion of the interval 122, a time 124 indicates the time when the circuit enters a low power sleep mode after post processing activity. After the time 124 is an interval 126 for the sleep fine count time. At the conclusion of the sleep fine count time interval 126 is a time 128 that indicates the expiration of the sleep fine count.

Following the time 128 is a sleep base count interval 130. The end of the sleep base count interval 130 is at a time 132, which is the time at which the sleep base count expires and the wake-up process begins. After the time 132 is an interval 134 during which wake-up overhead is accounted for and preparation is performed for a next active time. At the conclusion of the interval 134 is a time 136 at which the active mode begins after the end of the sleep mode. The resumption of the active mode is aligned with the 625 μs slots of the signal 92, even though the sleep base time signal 625 μs may be shifted out of alignment as a result of the go-to-sleep process. The comments regarding the determination of the wake-up time overhead for FIG. 2 apply to FIG. 3 as well.

Along the bottom of the graph 90 are shown intervals including an interval 138 which is the total sleep duration. An interval 140 shows the time from the go to sleep to the next activity by the circuit. An interval 142 is the duration between two activities or active modes by the circuit.

To maximize the sleep duration until the active mode can be resumed in alignment with the 625 μs clock signal, the method and apparatus calculate the sleep time in terms of the sleep fine count signal (which may have a 30.5 μs pulse timing) and the sleep base count signal (which may have the 625 μs pulse timing). The method and apparatus considers the wake-up overhead which include crystal warm-up time when determining a resumption of the active mode after a sleep mode.

Figure 4:
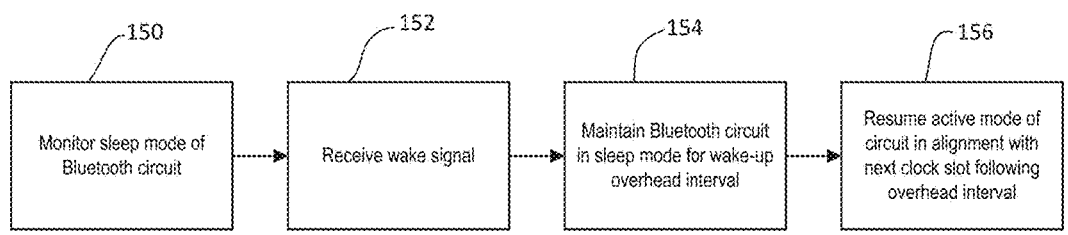
FIG. 4 is a flow chart showing an exemplary waking up process for waking up the Bluetooth circuit.

In FIG. 4, a waking process includes a step 150 of monitoring the sleep mode of the Bluetooth circuit. In a step 152, a wake-up signal is received. The wake-up signal may be either an external wake-up signal or an internal wake=up signal. In step 154, the Bluetooth circuit remains in sleep mode after the receipt of the wake-up signal for an overhead interval. After the end of the overhead interval, in step 156 the circuit resumes the active mode in alignment with a next clock signal slot following the overhead interval.

Figure 5:
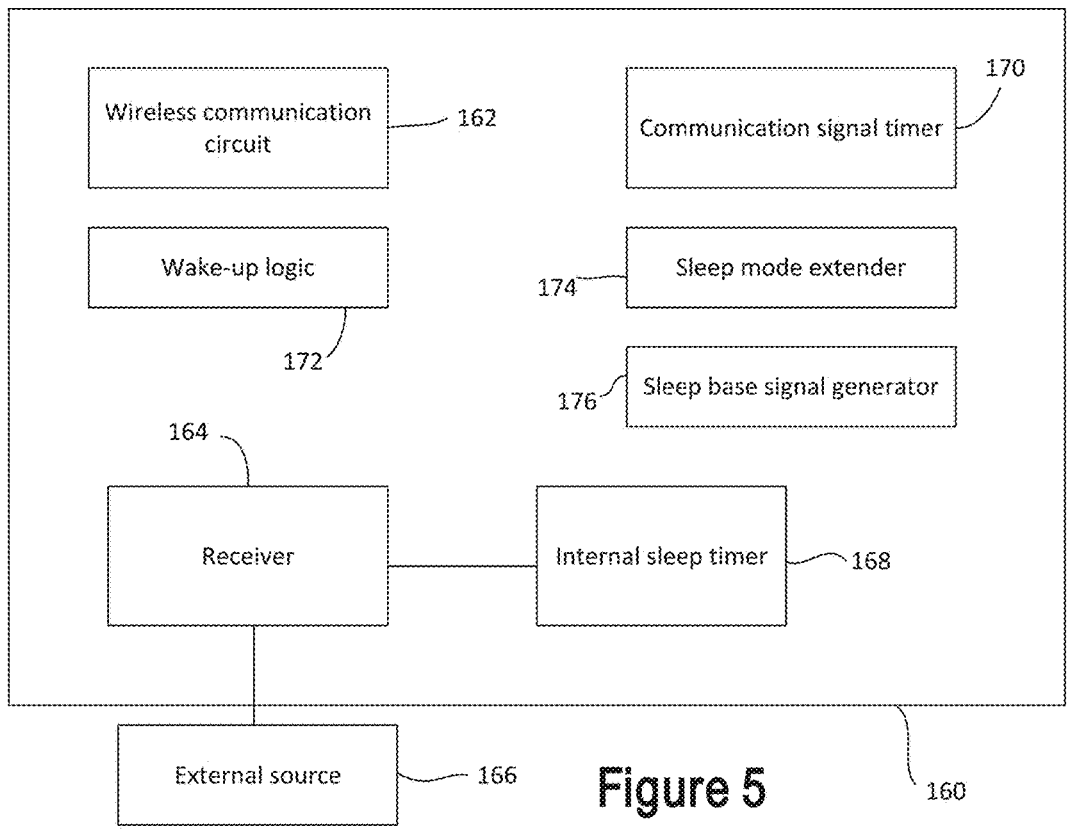
FIG. 5 is a functional block diagram of an exemplary user equipment enabled for wireless communication.

FIG. 5 shows a wireless enabled apparatus 160 that has a wireless communication circuit 162 that may be in sleep mode. The apparatus 160 has a receiver 164 connected to receive a wake-up signal. The wake-up signal may be received from an external source 166 or from an internal sleep timer 168. A timer 170 provides a timing signal for the wireless communication. The apparatus 160 includes a sleep mode extender 172 that is operable to extend the sleep mode beyond receipt of the wake-up signal. The apparatus 174 also includes wake-up logic that is operable to awaken the communication circuit 162 in alignment with the communication timing signal. The apparatus 160 may have a sleep base signal generator 176 that is operable to generate a sleep base signal. The apparatus 160, which may be a Bluetooth enabled apparatus, may include memory for storing software, a processor for executing the software, and all necessary circuits and components for the wireless communication and other functions as desired.

Figure 6:
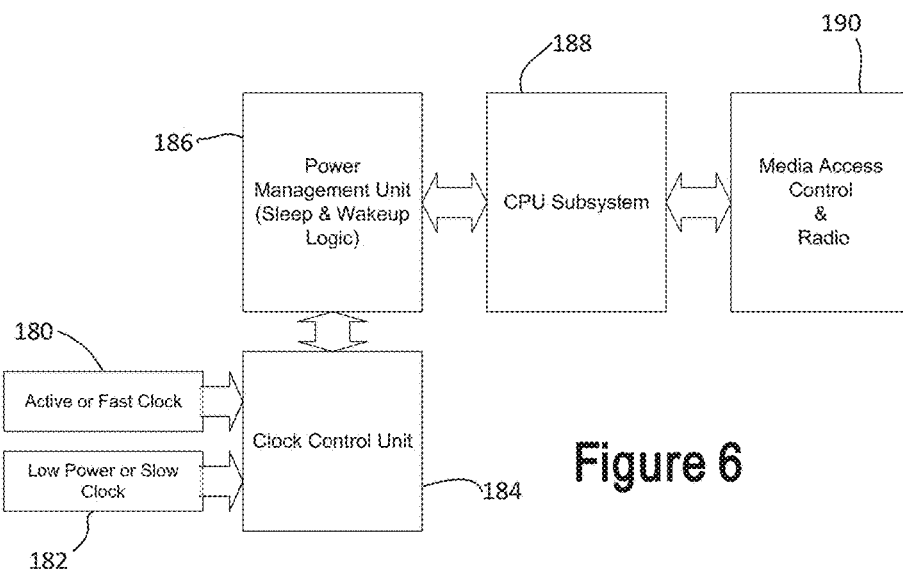
FIG. 6 is a functional block diagram of a Bluetooth transceiver system showing units used in putting the transceiver system into sleep mode and awakening the transceiver system from sleep mode.

FIG. 6 shows an active or fast clock 180 and a low power or slow clock 182 that provide clock signals to a clock control unit 184. The clock control unit 184 provides the clock signals to a power management unit 186 that includes the sleep and wake-up logic. The power management unit 186 communicates with a CPU subsystem 188. The CPU subsystem communicates with a media access control and radio 190. The active or fast clock 180 is generated from an external crystal source used for generating all system clocks in the CCU (clock control unit) required for the active mode. The low power or slow clock source 182 is used for running the sleep and wake-up logic. The CPU subsystem 188 encompasses firmware code, program memory, data memory, interrupts, interface to the PMU (power management unit) 186 and MAC/Radio blocks 190.

In certain aspects, a delaying in waking up the Bluetooth transceiver is provided until a wake-up overhead duration prior to a timing slot in the Bluetooth timing signal so that the Bluetooth transceiver completes a change from sleep mode to active mode at a Bluetooth timing signal time slot.

According to an aspect of the present method and apparatus, when the circuit is about to go into the low power mode or sleep mode, the circuit determines the current time and a next scheduled slot time.

In the situation where the wake-up of the sleeping circuit is the result of an external trigger and in the situation where the wake-up of the sleeping circuit is the result of an internal sleep timer interval, the total time between active modes includes a sleep fine count at a higher signal frequency, a sleep base count at a lower signal frequency, and a wake-up interval during which the wake-up overhead is considered and preparation is make for a next active time, or active mode. The duration of the time between the active modes is thus divided into three parts. The high frequency sleep fine count of certain examples may include pulses at 30.5 μs intervals. The sleep fine count pulses may be at a 31 μs spacing. The pulses may be described interchangeably as at 30.5 μs intervals, at 31 μs intervals or at about 31 μs intervals. The lower frequency sleep base count signal may have a pulse spacing of 625 μs. Either of these signals or any other signals described herein may be at other intervals or of other shapes.

The conventional implementation of sleep logic hardware uses a low power clock signal of 32 KHz or 32.768 KHz (which may be a sleep fine count signal) in order to maintain the sleep duration.

According to certain aspects of the present method and apparatus, the sleep time is increased for an external event wake-up by using sleep clock rate of 1.6 KHz that has been derived from 32 KHz or 32.768 KHz signal. By using the derived clock signal, the wake-up instant is always aligned to 625 µs timing pulses denomination.

Using this method allows a transceiver portion of a device to remain in sleep mode until the sleep base count signal boundary, hence maximizing the sleep time. By increasing the duration of the sleep time until active communication can begin, the power used by the transceiver circuit is reduced, reducing power consumption and improving efficiency.

Each time that the Bluetooth circuits of the device awake from a sleep mode, the wake-up can be delayed by between 0 and 624 µs, a remainder of a clock cycle. It is also possible that the delay in wake-up may have a duration of one or more additional clock cycles, as noted above. The Bluetooth circuits may sleep and awake repeatedly, adding a power saving each time. The present method and apparatus will contribute to improve overall power number for a Bluetooth enabled device. In certain examples, a Bluetooth circuit will go into sleep mode as frequently as several times a second to several times in minutes, based on the configuration and the use-case scenario. The sleep mode may be configured by the user or by the system itself. For example, a Bluetooth Low Energy connection interval varies between ever 7.5 ms to 4 seconds. The Bluetooth host can set this parameter to the device. If the connection interval is set to 100 ms, the device may enter sleep mode and be awakened 10 times per second. The wake-up procedure according to the present description may be utilized each time the device awakes from sleep mode. The cumulative effect of the delayed return to awake mode until the circuit is ready to begin active communication can result in significant energy savings.

According to a first aspect, a method for waking a wireless communication circuit from a sleep mode, comprising: receiving a wake-up signal; maintaining the wireless communication circuit in the sleep mode after receiving the wake-up signal for a wake-up time duration based on wake-up overhead of a wireless communication circuit; and changing the wireless communication circuit to an active mode after the wake-up time duration.

According to a second aspect, a method of the first aspect, wherein the wake-up time duration includes at least a remainder of a time slot in a timing signal from the wake-up signal to a next time slot.

According to a third aspect, a method of the first aspect, wherein the wake-up duration includes a remainder of a time slot in the timing signal from the wake-up signal and additional time slot in the timing signal.

According to a fourth aspect, a method of the first aspect, wherein the wake-up overhead includes boot-up and initialization time for the wireless communication circuit.

According to a fifth aspect, a method of the first aspect, wherein the wake-up overhead includes an oscillator crystal warm-up time.

According to a sixth aspect, a method of the fifth aspect, wherein the wake-up overhead includes an oscillator crystal warm-up time and a boot-up and initialization time.

According to a seventh aspect, a method of the first aspect, wherein the wake-up signal is an external wake-up signal.

According to an eighth aspect, a method of the first aspect, wherein the wake-up signal is an internal wake-up signal.

According to a ninth aspect, a method of the first aspect, further comprising: timing a sleep mode duration using a sleep base count signal.

According to a tenth aspect, a method of the first aspect, wherein the wireless communication is Bluetooth wireless communication.

According to an eleventh aspect, a method of the first aspect, wherein the wireless communication circuit changes to an active mode in alignment with a 625 µs clock signal pulse after the wake-up duration.

According to a twelfth aspect, an apparatus for awaking a wireless communication circuit from a sleep mode, comprising: a media access control and radio that is operable to provide wireless communication, the media access control and radio being operable to change from a sleep mode to an active mode; a processor connected to the media access control and radio, the processor being operable to process at least one of data to be transmitted by the media access control and radio and data received by the media access control and radio; a power management unit that is operable to awaken the media access control and radio from the sleep mode; a clock control unit connected to provide clock signals to the power management unit; an active clock connected to provide an active clock signal to the clock control unit; a low power clock connected to provide a low power clock signal to the clock control unit; wherein the power management unit includes wake-up logic that extends the sleep mode of the media access control and radio beyond receiving a wake-up signal, the wake-up logic changing the media access control and radio from the sleep mode to active mode in alignment with a time slot of the active clock signal.

In a thirteenth aspect, an apparatus according to the twelfth aspect, wherein the media access control and radio is a Bluetooth media access control and radio.

In a fourteenth aspect, an apparatus according to the twelfth aspect, wherein the power management unit operates to awaken the media access control and radio following receipt of an external wake-up signal.

In a fifteenth aspect, an apparatus according to the twelfth aspect, wherein the power management unit operates to awake the media access control and radio following an internal wake-up signal.

In a sixteenth aspect, an apparatus according to the twelfth aspect, wherein the wake-up logic extends the sleep mode by a duration that accounts for at least one of oscillator crystal warm-up time and a boot-up/initialization time.

In a seventeenth aspect, a method for extending a sleep mode of a Bluetooth transceiver in a user equipment, comprising: determining a wake-up overhead duration of the Bluetooth transceiver; receiving a wake-up signal; receiving a Bluetooth timing signal comprising a plurality of time slots; delaying waking up the Bluetooth transceiver until the wake-up overhead duration prior to a timing slot in the Bluetooth timing signal so that the Bluetooth transceiver completes a change from sleep mode to active mode at a Bluetooth timing signal time slot.

In an eighteenth aspect, a method according to the seventeenth aspect, wherein the wake-up signal is received from an external source.

In a nineteenth aspect, a method according to the seventeenth aspect, wherein the wake-up signal is from an internal timer.

In a twentieth aspect, a method according to the seventeenth aspect, wherein the delaying delays the waking up for a duration of more than one time slot.

In a twenty-first aspect, an apparatus for awaking a wireless communication circuit from a sleep mode, comprising: a receiver connected to receive a wake signal in a user equipment; means for extending the sleep mode of the wireless communication circuit beyond the receipt of the wake signal unit an active mode can be resumed in alignment with a wireless communication timing signal; and means for awakening the wireless communication circuit to active mode in alignment with the wireless communication timing signal.

In a twenty-second aspect, an apparatus according to the twenty-first aspect, wherein the means for extending the sleep time accounts for at least one of crystal warm-up time for an oscillator in the wireless communication circuit and boot-up/initialization time for the wireless communication circuit.

In a twenty-third aspect, an apparatus according to the twenty-first aspect, wherein the wireless communication circuit is a Bluetooth circuit.

In a twenty-fourth aspect, an apparatus according to the twenty-first aspect, wherein the means for receiving the wake-up signal is a means for receiving the wake-up signal from an external source.

In a twenty-fifth aspect, an apparatus according to the twenty-first aspect, wherein the means for receiving the wake-up signal is a means for receiving the wake-up signal from an internal sleep timer.

In a twenty-sixth aspect, an apparatus according to the twenty-first aspect, further comprising: means for generating a sleep base signal.

In a twenty-seventh aspect, an apparatus according to the twenty-first aspect, wherein the sleep base signal has a same frequency as wireless communication timing signal.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for waking up a wireless communication circuit of a device from a sleep mode, the wireless communication circuit being operable for wireless communication in predetermined time slots of a timing signal, comprising:
   receiving a wake-up signal while the wireless communication circuit is in the sleep mode, wherein the wake-up signal is external of the device and is out of alignment with the predetermined time slots of the timing signal;
   maintaining the wireless communication circuit in the sleep mode after receiving the wake-up signal without waking the wireless communication circuit from the sleep mode, the maintaining in the sleep mode being for a wake-up time duration based on a predetermined wake-up overhead time of the wireless communication circuit; and
   changing the wireless communication circuit from sleep mode to an active mode after the wake-up time duration.

2. A method as claimed in claim 1, wherein the wake-up time duration during which the wireless communication circuit is maintained in sleep mode includes at least a remainder of a time slot in the timing signal from the wake-up signal to a next time slot.

3. A method as claimed in claim 2, wherein the wake-up duration during which the wireless communication circuit is maintained in sleep mode includes a remainder of a time slot in the timing signal from the wake-up signal and an additional time slot in the timing signal.

4. A method as claimed in claim 1, wherein the wake-up overhead includes boot-up and initialization time for the wireless communication circuit.

5. A method as claimed in claim 1, wherein the wake-up overhead includes an oscillator crystal warm-up time.

6. A method as claimed in claim 5, wherein the wake-up overhead includes an oscillator crystal warm-up time and a boot-up and initialization time.

7. A method as claimed in claim 1, further comprising:
   timing a sleep mode duration using a sleep base count signal.

8. A method as claimed in claim 1, wherein the wireless communication is Bluetooth wireless communication.

9. A method as claimed in claim 1, wherein the timing signal includes 625 µs time slots, and wherein the wireless communication circuit changes to an active mode in alignment with a 625 µs clock signal pulse of the time slots after remaining asleep for the wake-up duration.

10. An apparatus for awaking a wireless communication circuit from a sleep mode, comprising:
- a media access control and radio that is operable to provide wireless communication within time slots, the media access control and radio being operable to change from a sleep mode to an active mode;
- a processor connected to the media access control and radio, the processor being operable to process at least one of data to be transmitted by the media access control and radio and data received by the media access control and radio;
- a power manager that is operable to awaken the media access control and radio from the sleep mode, the power manager being operable to receive a wake-up signal at a time between the time slots;
- a clock controller connected to provide clock signals to the power manager;
- an active clock connected to provide an active clock signal to the clock controller;
- a low power clock connected to provide a low power clock signal to the clock controller;
- wherein the power manager includes wake-up logic that extends the sleep mode of the media access control and radio beyond receiving a wake-up signal without waking the media access control and radio from the sleep mode, the wake-up logic changing the media access control and radio from the sleep mode to active mode in alignment with a time slot of the active clock signal after maintaining the media access control and radio in the sleep mode without waking from receiving the wake-up signal to enable communication in an alignment with the time slot of the active clock signal.

11. An apparatus as claimed in claim 10, wherein the media access control and radio is a Bluetooth media access control and radio and the time slots are Bluetooth time slots.

12. An apparatus as claimed in claim 10, wherein the power manager operates to awaken the media access control and radio at a time slot following receipt of an external wake-up signal at a time between the time slots.

13. An apparatus as claimed in claim 10, wherein the power manager operates to awake the media access control and radio at a time slot following an internal wake-up signal at a time between the time slots.

14. An apparatus as claimed in claim 10, wherein the wake-up logic extends the sleep mode by a duration that accounts for at least one of oscillator crystal warm-up time and a boot-up/initialization time.

15. A method for extending a sleep mode of a Bluetooth transceiver in a user equipment, comprising:
- determining a wake-up overhead duration of the Bluetooth transceiver;
- receiving a wake-up signal in the user equipment while the Bluetooth transceiver is in sleep mode;
- receiving a Bluetooth timing signal comprising a plurality of time slots in the user equipment;
- delaying initiating waking up the Bluetooth transceiver until the wake-up overhead duration prior to a timing slot in the Bluetooth timing signal so that the Bluetooth transceiver completes a change from the sleep mode to active mode at a Bluetooth timing signal time slot; and
- waking up the Bluetooth transceiver from the sleep mode at the Bluetooth timing signal time slot without waking the Bluetooth transceiver from the sleep mode from the receiving the wake-up signal to the wake-up duration prior to the timing slot.

16. A method as claimed in claim 15, wherein the wake-up signal is received from an external source.

17. A method as claimed in claim 15, wherein the wake-up signal is from an internal timer.

18. A method as claimed in claim 15, wherein the delaying delays a time between receiving the wake-up signal to completing the change from the sleep mode to the active mode for a duration of more than one time slot.

* * * * *